Figure 4:
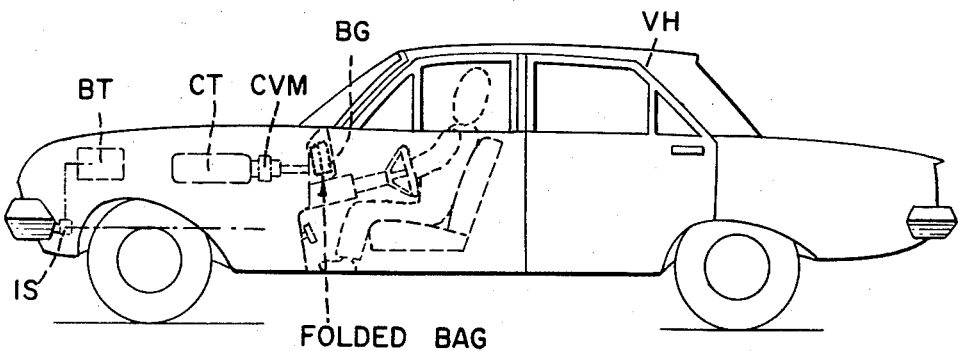

United States Patent [19]
Kramer et al.

[11] 3,788,666
[45] Jan. 29, 1974

[54] PROTECTION SYSTEM

[75] Inventors: Jack M. Kramer, Los Angeles; Abdul N. Sitabkhan, El Monte, both of Calif.

[73] Assignee: HTL Industries, Inc., Monrovia, Calif.

[22] Filed: July 27, 1971

[21] Appl. No.: 166,528

[52] U.S. Cl. ............ 280/150 AB, 169/2 A, 180/91
[51] Int. Cl. ............................................ B60r 21/08
[58] Field of Search ........ 280/150 AB; 180/103, 91; 169/2 A

[56] References Cited
UNITED STATES PATENTS

| | | | |
|---|---|---|---|
| 3,618,974 | 11/1971 | Chute | 280/150 AB |
| 3,642,303 | 2/1972 | Irish et al. | 280/150 AB |
| 3,603,535 | 9/1971 | Depolo | 280/150 AB |
| 2,834,606 | 5/1958 | Bertrand | 280/150 AB |
| 3,651,886 | 3/1972 | Barenyi | 180/103 |
| 3,588,140 | 6/1971 | Chute | 280/150 AB |
| 3,654,412 | 4/1972 | Haruna et al. | 180/91 X |
| 3,295,101 | 12/1966 | Ellis | 180/103 X |
| 2,931,665 | 4/1960 | Sandor | 280/150 AB |
| 3,628,809 | 12/1971 | Cirillo | 280/150 AB |
| 3,690,695 | 9/1972 | Jones, Sr. | 280/150 AB |
| 3,663,035 | 5/1972 | Norton | 280/150 AB |
| 3,516,685 | 6/1970 | Goetz | 280/150 AB |

*Primary Examiner*—Kenneth H. Betts
*Assistant Examiner*—John P. Silverstrim
*Attorney, Agent, or Firm*—Harold L. Jackson et al.

[57] ABSTRACT

Covers an arrangement for protecting people and property carried by a vehicle, such as an automobile or aircraft. The arrangement may include an impact switch, a control valve mechanism, a tank filled with fluid, one component of which may be a fire extinguishing agent, and an inflatable bag, the arrangement being so organized that, upon impact with another vehicle or a stationary body, the switch will complete a circuit to operate the control valve mechanism to release the fluid contents of the tank into the bag and thereby inflate it to enable it to act as a cushion. Then the bag may be deflated and the fluid released to protect the vehicle and its people and property against fire.

21 Claims, 7 Drawing Figures

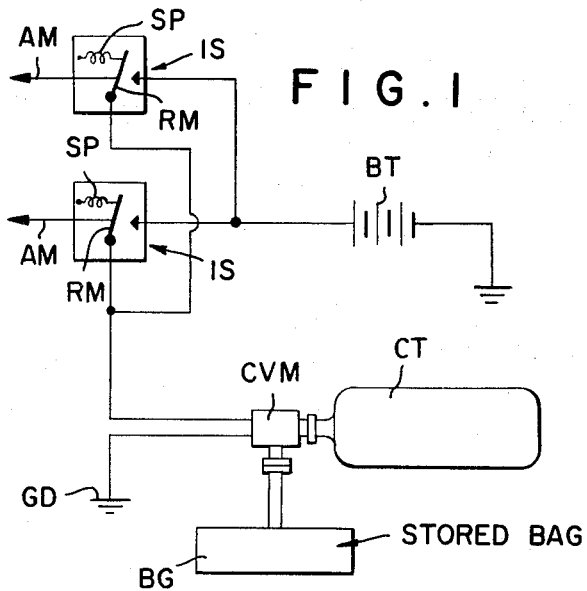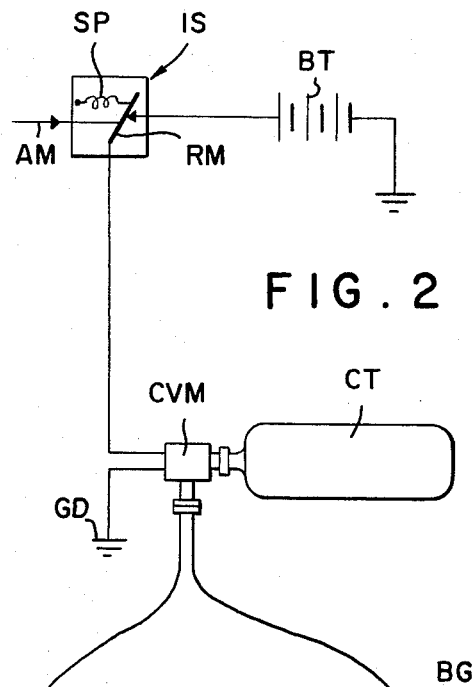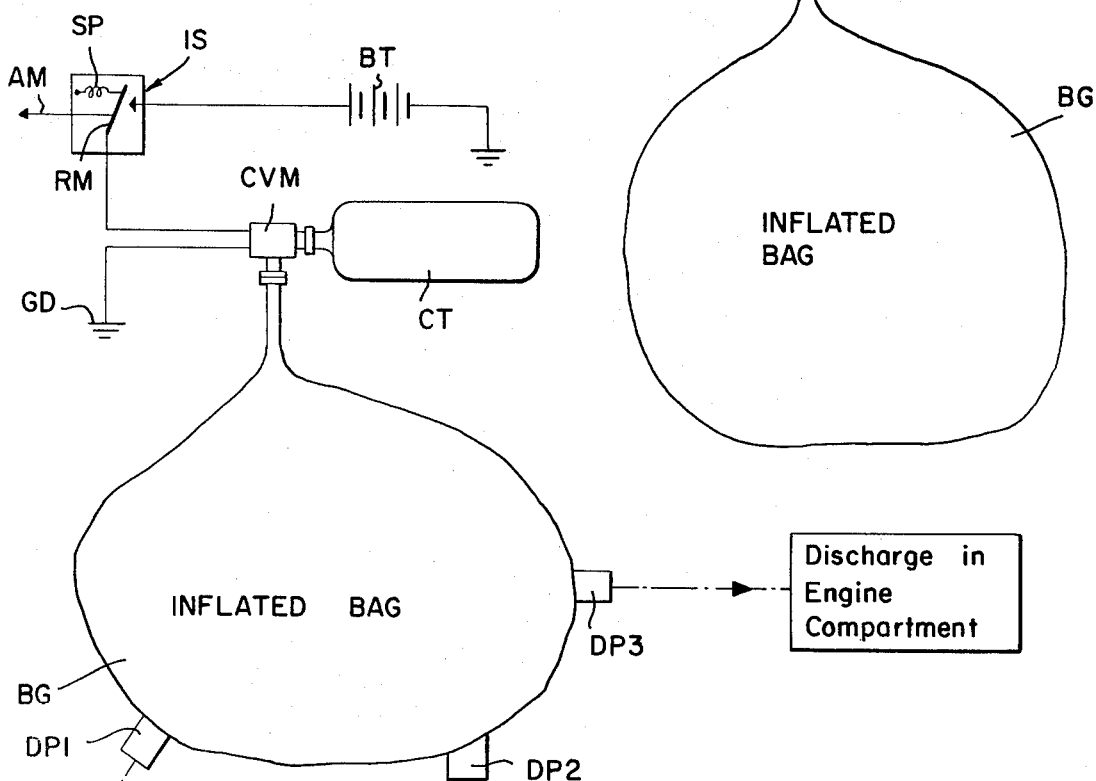

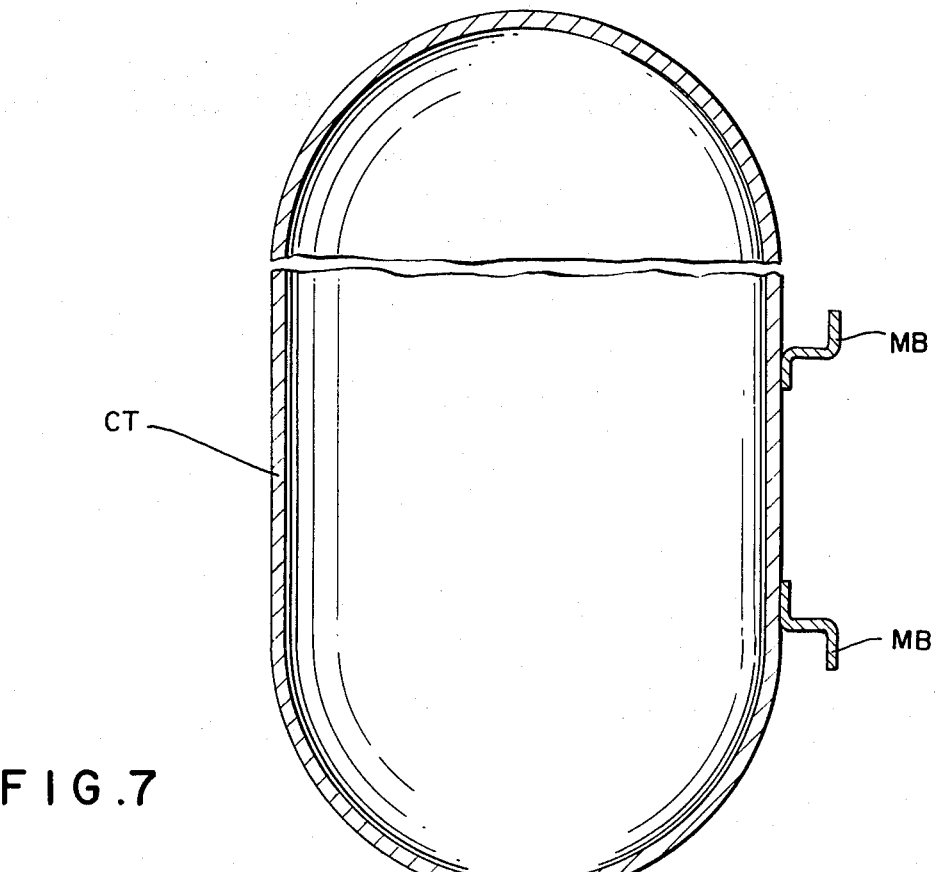
FIG.7
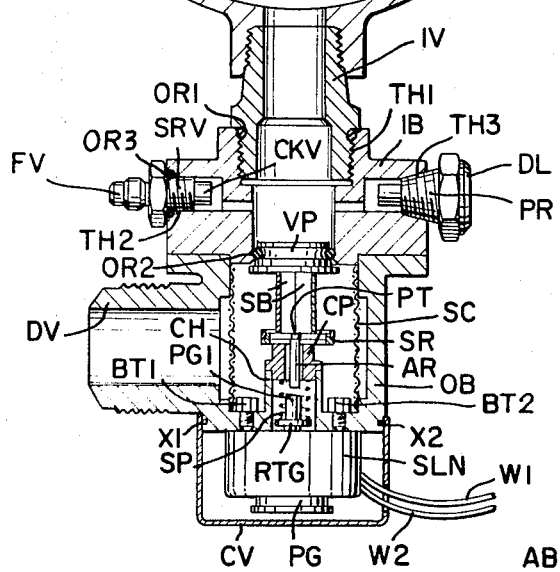

PROTECTION SYSTEM

This invention relates generally to protective apparatus suitable for protection against collisions. More particularly, this invention relates to protective apparatus for use in vehicles such as automobiles, airplanes, ships, and other mobile craft and for use in the protection of persons and property from the effects of collisions or fires, or both.

It has been proposed that, because of the numerous daily instances in which automobiles, for example, are involved in collisions in which the passengers are often subjected to serious injuries, sometimes resulting in fatalities, an air bag be provided within each such vehicle for the protection of the riders in the event of a collision. Immediately upon impact with another vehicle or a foreign body, it is proposed to have a gas supplied quickly to an inflatable bag which may be positioned in front of, or adjacent to, the driver or passengers within the vehicle, so that the inflated bag will provide a "cushion" which is flexible and can easily take up the force and momentum developed in the course of the impact with the vehicle or foreign body.

An inflated bag filled with a gaseous medium obviously has but limited value especially because it cannot protect the driver and the passengers, as well as the property carried or hauled by the vehicle, in the event that a fire should accompany the collision. The far greater danger, in many cases, is the actual fire that often accompanies a violent collision. The large losses due to fire are quite extensive.

One of the principal objectives of this invention is, therefore, to provide a special arrangement for a vehicle in the form of an inflatable bag which becomes inflated immediately upon impact with another vehicle or a foreign body and a tank to supply the inflatable bag with a fire extinguishing liquid or gas so as to protect the passengers as well as the property in the event that a collision occurs with another vehicle or foreign body whether or not a fire also accompanies the collision.

According to the present invention, an inflatable bag will be fluidically coupled to the discharge valve of a container filled with appropriate fire extinguishing materials. The bag and the discharge valve will be so arranged that, immediately on impact with another vehicle or a foreign body, the discharge valve will release the contents of the container into the inflatable bag at a relatively high speed so as to immediately provide a "cushion" available to the driver and the passengers of the car for their protection. Very soon after the bag has been inflated to a sufficient and predetermined size, the bag will become opened or deflated so as to promptly release the fire extinguishing materials previously inserted into the inflatable bag. The fire extinguishing agent will serve to extinguish whatever fire may have occurred and will prevent the start or spread of a fire and thereby protect the driver and passengers, as well as all of the property, against the effects of the collision and against any such incipient, menacing fire conditions. This will also allow the driver and passengers sufficient time to evacuate the vehicle and, moreover, enable them also to remove any property that may be within the vehicle.

A fire extinguishing medium, such as freon FE1301 (bromotrifluoromethane, $CBrF_3$) in a 6 to 7 percent concentration, is known to be virtually free of toxicity and therefore can hardly be expected to harm human beings. Furthermore, such a fire extinguishing agent leaves no appreciable residue to permanently damage the vehicle or the property and it produces no after-effects on human beings. At the same time, and more importantly, the agent concentration is sufficient to snuff out any fire that may have started, and, because of its effusiveness, the fluid can attack and penetrate other adjacent zones for a sufficient period of time to render to those zones virtual immunity against fire or against re-ignition of a fire or against any inflamatory condition.

Figure 5:
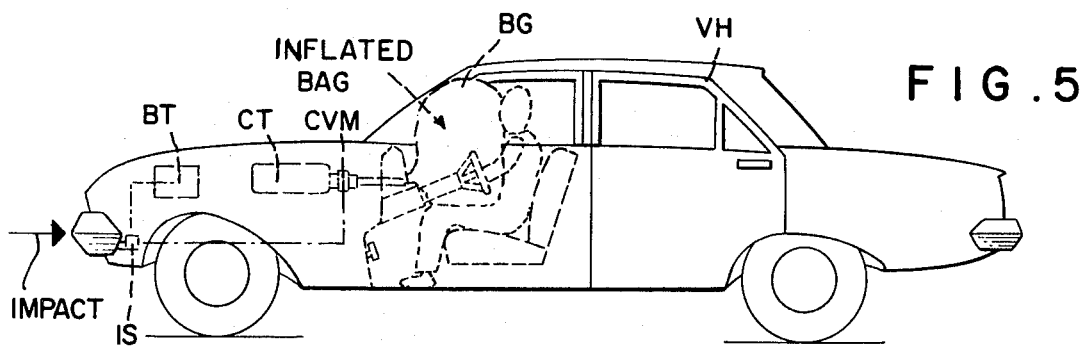
Figure 6:
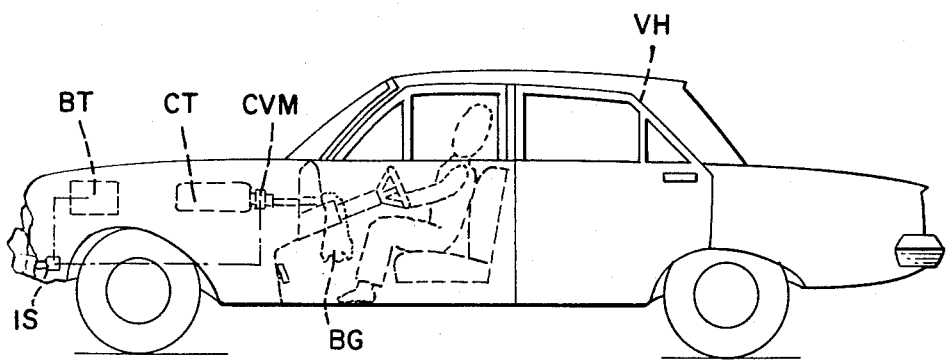

This invention will be better and more clearly understood from the following more detailed description and explanation hereinafter following when read in connection with the accompanying drawing in which:

FIG. 1 schematically illustrates an arrangement of basic components suitable for operation according to this invention, the components being shown in their non-operated condition;

FIG. 2 schematically illustrates an arrangement of the components of this invention in their normally operated condition;

FIG. 3 schematically shows a modification of the combined arrangement suitable for supplying gas from an inflatable bag into two or more regions or zones;

FIG. 4 schematically shows a motor vehicle equipped with a combination of components suitable for the practice of this invention;

FIG. 5 schematically shows a similar vehicle in which the equipment is illustrated in its operated condition upon impact with a foreign body;

FIG. 6 shows a later stage of the operation of the equipment of FIGS. 4 and 5 in which the inflatable bag has been caused to release its fluid; and FIG. 7 shows a more detailed drawing of one form of mechanism that may be used in supplying fire extinguishing fluid or other gas to an inflatable bag in accordance with this invention.

Throughout the drawing, the same or similar reference characters will be employed to designate the same or similar parts wherever they may occur throughout the drawing.

Referring particularly to FIGS. 1 and 2 of the drawing, an impact switch IS is schematically shown connected between a source of voltage, such as battery BT, and a control valve mechanism CVM and ground GD as shown. The control valve mechanism CVM, a form of which will be illustrated in greater detail in FIG. 7, is employed to couple a substantially rigid container CT to a rubber bag or other flexible and inflatable container designated BG. The impact switch IS is one of a plurality of similar or identical switches which may be bridged in parallel with each other as shown between the source of voltage BT and the electrical circuit feeding the voltage of battery BT to the control valve mechanism CVM. Each impact switch IS includes an armature RM which may be held in its left or unoperated position by means of a spring SP. The activating arm AM of the switch IS may be an elongated arm. A plurality of similar elongated arms AM of the kind just referred to may be positioned near or along the front bumper of a motor vehicle so that, upon contact with another vehicle or a foreign body at any point along the bumper, the arm AM will be moved to actuate the impact switch IS if the force of the impact or collision is sufficiently great to overcome the predetermined holding force of the spring SP. Similar longitudinal impact terminals AM may be located along the rear bumper of the vehicle and they may also be wired in parallel to the same circuit controls of valve mechanism CVM.

When an impact or collision has been experienced with an external barrier or with another vehicle, the armature RM of the impact switch IS will be moved to respond to the longitudinal movement of arm AM so as to close its forward contact. When this happens, current will flow from the source BT through the forward contact and armature RM of the impact switch IS and then through a valve or relay, such as CVM, which may be a solenoid valve, and then to ground GD.

As will be explained in more detail hereinafter, FIG. 2 schematically indicates the conditions of the components promptly after the impact or collision has occurred. The solenoid valve or other control mechanism of the control valve structure CVM will be activated to release the pressurized fluid from the container CT so that the fluid may be fed through the discharge valve into the inflated bag BG. FIG. 2 shows the rubber or inflatable bag BG in its inflated condition.

The impact switch IS may be set, by proper preliminary adjustment, so that its forward contact will be closed by the longitudinal movement of the armature RM of the impact switch IS when the vehicle is travelling substantially in a straight line direction at a speed of, for example, 30 MPH or at a higher speed. The impact switch IS may close its forward contact when the vehicle is travelling off the normal straight-line path at an angle anywhere within a range of, say, 30 degrees from a straight-line direction, or when the vehicle is travelling and is impacted in a roll-over mode at a speed exceeding, for example, 30 MPH. The switch IS may be set so that, unless the appropriate or predetermined force is delivered to its arm AM, the forward contact of the impact switch will not be closed.

The inflatable bag BG may be any rubber or extensible bag capable of enlarging sufficiently to enclose all of the fluid supplied by the container CT and required for the conditions of protection. The size of the tank CT, the properties of the fire-extinguishing fluid and its pressure, and the proportions and elasticity of bag BG under the required critical pressures may readily be selected or adjusted to meet the conditions to be encountered and to provide the operating features to be achieved.

Not only should the inflatable bag BG be capable of expanding to receive a sufficient volume of the fluids from the container CT, but the control valve mechanism CVM must also be capable of releasing the fluids rapidly after the bag BG has reached a predetermined size. In other words, the bag BG must be opened up in one way or another to release its contents very promptly when the assigned fluid pressure magnitude within the bag has been reached. The bag BG may be provided with serrations which will automatically break when the pressure within the bag reaches a predetermined value, or when the bag reaches its assigned size and then causes the serrations to open up to freely release the fluid contents of the bag BG. Or the bag BG may be equipped with a valve of any type which is designed to release the contents of the bag BG as soon as the internal pressure exceeds a predetermined value. In any case, the components used in this invention require that the valve mechanism CVM reach its full open condition in about 10 milliseconds from the time an electrical signal is generated pursuant to the operation of switch IS and that the contents of the container be emptied into the bag BG in about 100 to 300 milliseconds.

The container CT may be filled and pressurized with an inert gas or air if the bag BG is to be employed merely for the protection of the user against shock produced by impact with another vehicle or a foreign body. On the other hand, the container CT should be filled and pressurized with a fire extinguishing fluid if the bag BG is to be released to protect the passengers or others and their property against both the fire hazard and the shock which may occur almost simultaneously upon impact with a vehicle or a foreign object. This type of protection will also afford the passengers a distinct opportunity to vacate the vehicle very shortly after the impact has occurred.

If the bag BG should be filled with sufficient fluid, including a fire extinguishing agent such as freon FE 1301, which, as already noted, will minimize physical harm and also the occurrence of a fire, it will put out a fire if one has already been started, but the fluid is substantially free of toxicity to human beings. It is fairly established that such a fire extinguishing agent leaves no residue and no after-effects upon human beings. The bag BG may not only serve as a barrier or "pillow" for the passenger or passengers in a vehicle crash, but, upon the opening of the bag BG to release its contents, the fluid will serve efficiently to remove any danger of the occurrence of fire and snuff out any fire that may have been started.

FIG. 3 schematically shows a modified arrangement of this invention applied to an inflatable bag BG which may have a plurality of exit ports, only three of which are shown in the drawing. The port DP1 may discharge fluid, for example, to the chamber where the occupants of the vehicle are located. The port DP2 may discharge fluid to another fire zone which may be, for example, the trunk of the vehicle. The discharge port DP3 may discharge fluid, for example, into the engine compartment of the vehicle. Thus, any number of discharge ports may be provided for simultaneously feeding fluid for fire protection purposes to several distinct regions of a single vehicle or other structure. All such ports may reach a plurality of bags such as BG, in a multi-passenger coach or aircraft.

FIG. 4 schematically shows an outline of the motor vehicle with an impact switch IS located at the front of the vehicle VH, a folded bag BG strategically located under or near the dash-board of the vehicle, i.e., near the driver of the vehicle or other persons seated on the front seat, and a pressurized container CT which may be located under the hood of the vehicle. As may be better seen in FIG. 5, after the vehicle strikes an obstruction or another vehicle with sufficient force, the impact switch IS will trigger the valve of the container CT to discharge its highly pressurized contents into the bag BG which is shown in its inflated condition. The first effect of inflation of the bag BG will be to provide a "cushion" to protect the person of the driver or other passengers at or near the front of the vehicle. As a secondary but equally important effect, the bag BG may be opened or discharged, as already explained, so that the fluid contents of the bag may be rapidly released and diffused into the chassis of the vehicle for the purposes intended in accordance with the invention.

The illustrations of FIGS. 4, 5 and 6 are merely representative and it will be apparent that any number of discharge ports may be associated with a particular bag BG to meet the exigencies of any occasion. Furthermore, two or more containers, such as CT, associated with two or more bags, such as BG, may be associated with a single motor vehicle or aircraft to supply the protection features required for various parts of the craft or for the various people.

It will be apparent that one or more containers, such as CT, and a plurality of bags, such as BG, may be associated with each or many of the positions in a large aircraft and simultaneously triggered to supply "cushions" and fire protection to all passengers and crew members. Such cushions may even be used as floats if a craft is involved in difficulties over water.

FIG. 7 illustrates one form of the container and its related mechanism that may be used for supplying fluids to any of the bags BG that may be used in connection with this invention. The mechanism illustratively includes a container CT which may be filled with a fluid, whether gaseous or liquid, and preferably also an additive fire extinguishing fluid, and the composite fluid within the container CT may preferably be pressurized by — for example, a gas such as nitrogen. The container CT is expected to be filled, or almost filled, with the fluid required for inflating the bag BG (or bags) shown in the other figures of the drawing. The pressurized fluid must also be delivered to the bag very promptly for immediate use whenever desired. The container CT may be provided with brackets MB for mounting the structure in a suitable location.

The container CT is shown fitted and sealed against an inlet valve IV, the seal being achieved in any well known manner, such as by a tapered opening, as shown, or by the use of sealing tape, or both. The inlet valve IV is fluidically sealed to the inlet body IB by threading TH1 and the inlet valve is also sealed to the inlet body IB by means of an O-ring OR1.

The inlet body has a fill valve FV screw-threaded into the body at TH2. The fill valve FV preferably includes a safety release mechanism SRV which is provided with a check valve CKV. A pressure gauge PR, which may be any appropriate standard pressure gauge, is threaded at TH3 into the inlet body IB. The pressure gauge PR is provided with a graduated dial DL for indicating the pressure of the fluid retained within the container CT and within the inlet valve IV associated with the inlet body IB. The inlet body IB is also provided with a displaceable valve plug VP which is sealed into the inlet body IB by means of an O-ring OR2. So arranged and organized, the valve plug VP, when it is located in the position shown of FIG. 7, seals the pressurized fluid within the container CT and within the inlet valve IV against leakage or discharge so that the fluid may be readily available whenever an emergency may arise.

The mechanism of FIG. 7 also includes an outlet body OB which has a discharge valve DV for discharging the fluid contents of the container CT and of the inlet valve IV whenever desired. The valve plug VP separates the inlet body IB from the outlet body OB, thereby preventing the transmission of fluid through the outlet body OB or through the discharge valve DV.

The outlet body OB also houses a solenoid valve SLN which may be supplied with current over wires W1 and W2 whenever the solenoid valve SLN is to be energized and operated. The solenoid valve SLN includes a rapidly movable plunger PG, the upper end of which is designated PG1. The plunger PG1 is annularly grooved so as to support and hold a retaining ring RTG. The solenoid valve SLN is fixedly held within the outlet body OB by means of threaded bolts BT1 and BT2 so that the electromagnetic coil of the solenoid valve SLN will be held stationery but, when supplied with current over wires W1 and W2, the solenoid valve SLN will be energized and operated to advance the plunger PG upwardly, as will be explained.

The outlet body OB also includes any internal cylindrical housing CH and a cap CP seated on the cylindrical housing CH and affixed to the housing CH. The cap CP has a central opening for receiving an actuation rod AR which is to be free to move in a vertical direction. The lower end of the actuation rod AR may be normally spaced from the upper end of the plunger PG1 so that, when the solenoid valve SLN is actuated, the plunger PG1 will develop considerable momentum before it strikes the lower end of the actuation rod AR. The actuation rod AR is preferably made of a hard durable material, such as metal or plastic, and it is mechanically affixed to a horizontally positioned support ring SR at point PT. The support ring SR is epoxied or otherwise affixed to the actuation rod AR at point PT so that these components move in unison. The support ring SR is positioned at the base of an inverted cylindrical support bushing SB, which is sometimes called a "split bushing." This bushing SB may be made of two or more similar segments which are to be normally held together by such a retainer as ring SR.

When the apparatus is in its normal or stable condition, as shown in FIG. 7, the two-segment support bushing SB will be in its normal vertical position as shown, and the support bushing SB will be held between the valve plug VP and the cap CP. A helical spring SP is mounted within the housing CH between the underside of cap CP and the upper side of the retaining ring RTG. Under normal conditions, that is, when the solenoid valve SLN is not energized, the helical spring SP will press against and hold the plunger PG1 in its lowermost position so that the plunger PG1 will be spaced from the lower end of the actuation rod AR, as shown in FIG. 7. In this position, the split bushing SB will remain intact and unaffected in its present location, as shown.

However, when the solenoid valve SLN becomes energized by the supply of current over conductors W1 and W2, the plunger PG1 will be thrust upwardly from the position shown in FIG. 7 and will travel at relatively high speed with considerable momentum so as to advance the actuation rod AR vertically upwardly. By virtue of the joinder of the rod AR to the support ring SR, the ring SR will be lifted off the base of the two-segment support bushing SB. The two segments of the bushing SB will be collapsed and released, thereby withdrawing the bushing SB from the valve plug VP in the position shown in FIG. 7. In the absence of holding power of support bushing SB due to its collapse, the valve plug VP will be immediately subjected to the influence of the super-atmospheric pressure of fluid within the container CT and within the inlet body IB, whereupon the plug VP will be promptly displaced from the inlet body IB. The container CT will then release its fluid through a cylindrical screen CS and through the discharge valve DV into a conduit (not shown in FIG. 7) which connects the discharge valve DV with the bag BG of any of the earlier figures to be inflated.

The support bushing SB may be made of aluminum or of any other metal, preferably a light weight metal, or a suitable non-metallic material, and it must be strong enough to be able to withstand the rather high pressure supplied to it by the valve plug VP in the inlet body IB. The pressure applied to the valve plug VP is supplied by the fluid under pressure within the container CT. The bushing SB should preferably be permanently lubricated so that its friction may be reduced to facilitate its collapse and removal in response to the operation of the solenoid valve SLN.

The cylindrical screen SC, preferably made of metal, is employed primarily for allowing the fire extinguishing fluid to pass freely from the container CT through the cavity of the inlet body IB and then through the discharge valve DV of the outlet body OB, without allowing any of the segments of the support bushing SB, or the support ring SR, or the actuation rod AR, to be moved into the discharge valve DV. In other words, the screen SC will freely pass the fluid through the discharge valve DV but prevent any of the metallic or solid objects or parts to be discharged through the valve DV.

The fill valve FV may be employed to funnel the fluid to be inserted into the container CT via the input body IB. The fluid may be supplied through the fill valve FV in sufficient amount to develop a fairly high pressure, perhaps between 600 and 2,700 PSI. The pressure gauge PR serves as a ready indicator of the changes in the applied fluid pressure. The fill valve FV is preferably sealed against leakage by an O-ring OR3.

The fill valve FV includes checking mechanisms CKV in the form of a hollow housing filled with a fusible alloy, such as cerrobend. The cerrobend material starts to melt at, for example, a temperature between 205 degrees to 220 degrees F. The temperature of cerrobend material characteristically corresponds to the magnitude of the ambient fluid pressure. Thus, when the fluid pressurizes beyond an assigned value due to external or other conditions, the temperature of the cerrobend material will correspondingly rise and undergo a change in shape depending upon the magnitude of the rise in temperature. The cerrobend material may be melted or ruptured at a predetermined pressure and at its corresponding temperature. This pressure or temperature, whichever is considered, may be treated as the safety pressure or temperature. It is at this safety pressure or temperature that the mechanism of FIG. 7 will discharge fluid through the fill valve. Therefore, the fill valve FV and its cerrobend material serve as a constant check mechanism, disallowing the pressure and the corresponding temperature to rise above corresponding predetermined values. A substantial rise in temperature, brought about by extraordinary conditions surrounding the tank CT and its associated valve mechanism, will cause the cerrobend material to provide an avenue for the the release of fluid within the container CT until the pressure has dropped to a safe value or has released all of the fluid.

The equipment of FIG. 7 also includes a cover CV which is provided at the lower end of the outlet body OB. The cover CV is retained by extensions X1 and X2, which may be in the form of pins suitable for entering appropriate openings in the outlet body OB. The cover CV, therefore, serves to exclude dust, dirt and other superfluous material against entry into the opening of the outlet body OB. The cover CV also has a sized opening through which the wires W1 and W2 may be passed.

The equipment shown in FIG. 7 is essentially the same as equipment shown in the co-pending application of Carlo Pavone, Abdul N. Sitabkhan and J. M. Kramer, filed on July 27, 1971, bearing Ser. No. 166,529, and assigned to the same assignee.

Although the valve control mechanism of FIG. 7 is represented as one container arrangement for receiving and housing a fluid, whether gaseous or liquid, the arrangement also including mechanism for discharging the fluid received and housed in the container CT, it will be apparent that any other suitable mechanism may be substituted therefor within the scope of this invention.

While this invention has been shown and described in certain particular arrangements merely for illustration and explanation, it will be apparent that the structure of this invention may be embodied in other and widely varied organizations within the scope of this invention.

What is claimed is:

1. Apparatus for protecting the passengers and property of a multi-compartment vehicle upon collision, which comprises an inflatable receptacle which, when inflated, acts as a shock protective cushion, a source of superatmospherically pressurized fluid having a fire extinguishing agent additive, means responsive to a collision for feeding said fluid to said inflatable receptacle to raise the pressure therein to a predetermined value, and means responsive to the pressure within said receptacle reaching said predetermined value to simultaneously discharge the fluid therein into a plurality of compartments of the vehicle.

2. Protective apparatus for a multi-compartment vehicle, comprising an impulse sensor supported externally by the vehicle and actuated in response to the pressure accompanying a collision, an inflatable shock-absorbing container, and a tank containing superatmospherically pressurized fluid having a fire extinguishing additive, said tank being coupled to said container, means responsive to the actuation of said sensor to release the fluid of said tank into said container and means for subsequently releasing the fluid from said container into a plurality of compartments of the vehicle simultaneously.

3. Protective apparatus for a vehicle according to claim 2 including also means to discharge the fluid from the container upon the pressure within the container reaching a predetermined value.

4. Protective apparatus for a multi-compartment vehicle, comprising a plurality of impulse sensors carried by and exposed from the vehicle, any one of which may be actuated in response to the abnormal physical pressure accompanying a collision, a tank containing superatmospherically pressurized fluid having a fire extinguishing additive, an inflatable flexible container coupled to the tank to receive fluid from said tank, and means coupling all of said sensors to said tank, said means including mechanism responsive to the actuation of any of said sensors to discharge fluid from said tank into said container to inflate said container to render it shock-absorbent and means for subsequently releasing the fluid from said container into a plurality of compartments of the vehicle to minimize the possibility of fire.

5. Protective apparatus for a vehicle according to claim 4, in which the inflatable container includes a discharge port, and means responsive to a predetermined pressure within said container to discharge the fluid within said container into said vehicle compartments.

6. Protective apparatus according to claim 4 in which the inflatable container includes a plurality of discharge ports, and means responsive to a predetermined pressure within said container to simultaneously discharge the fluid within said container through said discharge ports simultaneously into separate compartments of the vehicle.

7. Protective apparatus for a vehicle, comprising a plurality of impulse sensors carried by and exposed from the vehicle and each movable in response to the pressure accompanying a collision, a tank containing super-atmospherically nitrogen pressurized fluid including about 7 percent concentration of bromotrifluoromethane, a plurality of flexible inflatable containers all of which are fluidically coupled to said tank to receive fluid from said tank, means responsive to the actuation of any of said sensors to release the fluid within said tank to said inflatable containers to render said containers shock absorbers and means for releasing the fluid into the vehicle to prevent fire.

8. Protective apparatus according to claim 7 including means responsive to a predetermined pressure within said inflatable containers to simultaneously discharge the fluid from said containers in different directions within said vehicle.

9. Protective apparatus for a multi-compartment vehicle, comprising a plurality of flexible inflatable containers which, when inflated, act as shock absorbing cushions, means for simultaneously filling said containers with nitrogen fluid having a fire extinguishing additive to inflate said containers, and means thereafter responsive to a predetermined pressure within said flexible inflated containers to discharge all of said flexible containers into the various vehicle compartment for fire protection.

10. Protective apparatus for a vehicle according to claim 9 including sensor mechanism carried by the vehicle and exposed to physical contact with other bodies and actuated by the pressure accompanying a collision with any other body to actuate the fluid filling means.

11. Apparatus protecting passengers of a vehicle according to claim 9 in which the flexible containers have discharge valves which release the fluid from said containers upon the fluid pressure therein reaching a predetermined value.

12. Protective apparatus for a multi-compartment vehicle comprising an impulse sensor affixed to the vehicle and responsive to the physical pressure accompanying a collision, a tank filled with pressurized fluid having a fire extinguishing additive, a container which is inflatable when fluid from said tank is inserted therein, a valve mechanism coupling said sensor to said tank, said valve mechanism including a first valve for receiving fluid to be fed to said tank and a second valve through which fluid from said tank may be discharged into said container to inflate said container to render it shock absorbing, means responsive to the actuation of said sensor to render the second valve operative to discharge fluid from said tank into said container, and means responsive to the rise of pressure within said container to a predetermined value to deflate the container and discharge the fluid from said container into a plurality of compartments in said vehicle to minimize the possibility of fire.

13. Protective apparatus for a vehicle according to claim 12 in which said valve mechanism includes a plug to block the discharge of fluid from said tank, and a solenoid valve which, when actuated, will displace said plug so that the second valve may allow the tank to discharge fluid into said container.

14. Protective apparatus for a vehicle according to claim 12 in which said valve mechanism includes a plug to block the discharge of fluid from said tank, a solenoid valve, and a collapsible member coupling said plug to the plunger of said solenoid valve so that, when the solenoid valve is operated, the plunger of the solenoid valve will be moved to collapse the member so as to displace said plug and allow fluid within the tank to be discharged into said container.

15. A method of protecting a multi-compartment vehicle against the adverse effects of a collision comprising the steps of:
sensing the impact of the collision;
discharging a super-atmospherically pressurized fire extinguishing fluid into a single inflatable container to cushion the physical effect of the impact; and
subsequently discharging the fluid from the single inflatable container into a plurality of compartments of the vehicle to minimize the occurrence of fire in any of said compartments or to extinguish fire that may have occurred in any of said compartments.

16. A method of protecting a multi-compartment vehicle and occupants against the adverse effects of a collision comprising the steps of:
sensing the impact of a collision and producing a corresponding impact signal;
discharging a super-atmospherically pressurized fire extinguishing fluid in response to the impact signal into at least one inflatable container positioned adjacent at least one occupant to cushion the occupant against the physical effect of the impact; and
subsequently discharging the fluid from the inflatable container into a plurality of compartments of the vehicle to minimize the occurrence of fire in any of said compartments or to extinguish fire that may have occurred in any of said compartments.

17. Apparatus for protecting a multi-compartment vehicle and occupants against the adverse effects of a collision comprising:
means for sensing the impact of a collision and producing a corresponding impact signal;
at least one inflatable container positioned adjacent at least one occupant to cushion the occupant against the effect of the impact when the container is inflated;
means for discharging a pressurized fire extinguishing fluid in response to the impact signal into the inflatable container to inflate the container; and
means for subsequently discharging the fluid from the inflatable container into a plurality of compartments of the vehicle to minimize the occurrence of fire in any of the compartments.

18. Apparatus for protecting an automobile and occupants against physical impact and fire resulting from a collision comprising:
means for sensing the impact of a collision and producing a corresponding impact signal;
at least one inflatable container positioned adjacent at least one occupant to cushion the occupant against the physical effect of the impact when the container is inflated;

a source of non-toxic freon pressurized fire extinguishing fluid;

means for discharging the non-toxic freon pressurized fire extinguishing fluid in response to the impact signal into the inflatable container to inflate the container; and means for subsequently discharging the non-toxic freon pressurized fire extinguishing fluid from the inflated container into the automobile to minimize the possibility of fire.

19. Apparatus as in claim 18 where the non-toxic fire extinguishing fluid includes bromotrifluoromethane.

20. Apparatus as in claim 19 where the amount of bromotrifluoromethane is approximately 7 percent, and the remainder of the fluid is nitrogen.

21. Protective apparatus for a multi-compartment vehicle, comprising a plurality of sensors, a tank filled with super-atmospheric pressurized fluid having a fire extinguishing additive, a plurality of expandable and inflatable containers, valve means coupling all of said sensors to said tank and to said containers, said valve means including an input port which is fluidically coupled to said tank to receive fluid from said tank and which also includes a plug to prevent the flow of fluid out of said tank, said valve means also including a solenoid valve together with means controlled by the solenoid valve to unseat the plug so that said tank may discharge fluid to said containers to be inflated, said valve means also including a plurality of output ports each respectively fluidically coupled to one of said containers and each discharging fluid from the tank to its corresponding container, and means to deflate all of said containers so as to discharge the fluid from said containers into a plurality of predetermined compartments of the vehicle to minimize the possibility of fire.

* * * * *